US008457777B2

(12) United States Patent
Goodman et al.

(10) Patent No.: US 8,457,777 B2
(45) Date of Patent: Jun. 4, 2013

(54) ACCESSOR CONTROL FAILOVER IN AN AUTOMATED DATA STORAGE LIBRARY

(75) Inventors: Brian Gerard Goodman, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2441 days.

(21) Appl. No.: 10/740,726

(22) Filed: Dec. 19, 2003

(65) Prior Publication Data

US 2005/0138248 A1 Jun. 23, 2005

(51) Int. Cl.
*G06F 7/00* (2006.01)

(52) U.S. Cl.
USPC ........................................ 700/214

(58) Field of Classification Search
USPC ............... 700/214, 213; 414/273; 369/30.61, 369/79
See application file for complete search history.

(56) References Cited

U.S. PATENT DOCUMENTS

| | | | |
|---|---|---|---|
| 5,646,918 A * | 7/1997 | Dimitri et al. ............. | 369/30.31 |
| 5,768,141 A | 6/1998 | Hanaoka et al. | |
| 5,894,461 A * | 4/1999 | Fosler et al. ............... | 369/30.31 |
| 5,914,919 A * | 6/1999 | Fosler et al. ............... | 369/30.31 |
| 5,959,866 A | 9/1999 | Hanaoka et al. | |
| 6,052,341 A * | 4/2000 | Bingham et al. ............. | 711/112 |
| 6,230,075 B1 * | 5/2001 | Nishijo et al. ................. | 700/214 |
| 6,356,801 B1 | 3/2002 | Goodman et al. | |
| 6,356,803 B1 | 3/2002 | Goodman et al. | |
| 6,434,090 B1 * | 8/2002 | Basham et al. ............. | 369/30.31 |
| 6,591,164 B1 * | 7/2003 | Plutt et al. ...................... | 700/245 |
| 6,609,046 B2 * | 8/2003 | Ostwald et al. ............... | 700/214 |
| 6,842,841 B1 * | 1/2005 | Kuik et al. ..................... | 711/203 |
| 6,922,709 B2 | 7/2005 | Goodman | |
| 7,082,497 B2 * | 7/2006 | Slater et al. ................... | 711/114 |
| 7,146,244 B2 * | 12/2006 | Byers et al. .................... | 700/218 |
| 7,318,116 B2 | 1/2008 | Gallo et al. | |
| 2003/0083782 A1 | 5/2003 | Borrego et al. | |

OTHER PUBLICATIONS

U.S. Appl. No. 10/079,637; Method for Maintaining Consistent Dual Copies of Vital Product Data in a Dual Accessor Library of Portable Storage Media; Inventor; Goodman.

* cited by examiner

*Primary Examiner* — Ramya Burgess
(74) *Attorney, Agent, or Firm* — Hamilton & Terrile, LLP; Stephen A. Terrile

(57) ABSTRACT

A method, system and a computer program product to increase the availability of an automated data storage library for accessing and storing data storage media are provided. Work requests received by an accessor controller of the library from a host computer are also received and stored by a work request tracking controller. The accessor controller converts the work request into commands necessary to direct an accessor to fulfill the work request, and then sends such commands to an accessor. Upon detection by the work request tracking controller that the so-directed accessor failed to conduct the command issued by the accessor controller, the work request tracking controller reconstructs the work request and sends it to an accessor controller. The provision of a work request tracking controller is a failover mechanism in the event an accessor controller fails to successfully direct an accessor to conduct commands in furtherance of a work request and/or has, for whatever reason, lost the work requests in its queue.

27 Claims, 10 Drawing Sheets

ACCESSOR CONTROL FAILOVER IN AN AUTOMATED DATA STORAGE LIBRARY

FIELD OF THE INVENTION

This invention relates to automated data storage libraries having one or more accessors, and more particularly, to controlling an accessor or an alternate accessor in the event such accessor fails to execute a work request received by its associated accessor controller.

BACKGROUND OF THE INVENTION

Automated data storage libraries are known for providing cost effective storage and retrieval of large quantities of data. The data in automated data storage libraries are stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, an automated data storage library also typically contains data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the X and Y directions.

It is often desirable to allow for expansion of an automated data storage library by including additional storage shelves and data storage drives and additional accessors. As an example, an IBM® 3494 Tape Library Dataserver1 automated data storage library is scaleable from a single base frame to a base frame with fifteen extension frames. The use of multiple accessors in an expanded automated data storage library can measurably improve the performance of the library, and as such, the IBM 3494 library may employ two accessors. Typically, both accessors travel on similar paths alongside the storage shelves and the data storage drives, with the paths being either common paths or independent paths, or a combination thereof. The coordination of multiple accessors in a single library to improve library availability can be accomplished in various ways. One such means of avoiding library outages by coordinating the activity of multiple accessors is termed "hot-standby" mode and involves the designation of one accessor as active and the other as inactive, and the operation of only the active accessor. Thus, the inactive accessor serves as a backup in case the active accessor fails or is taken out of service. An alternative means of providing additional availability between accessors is termed "dual-active" mode and involves the division of the physical library into zones of storage shelves and data storage drives and the separate operation of the accessors to access data storage media in the respective zones. Dual-active mode offers the advantage of potentially improving the overall performance of the library, since the work is shared between two or more accessors.

[1] IBM is a registered trademark of International Business Machines Corporation in the United States, other countries, or both.

Typically, a host system, such as a host server, communicates with the library directly or through one or more data storage drives, providing commands to the library to access particular data storage media and to move the media between the storage shelves and the data storage drives. The term "work requests" is used herein to refer to commands provided by the host system to the library to so access and move media. The work requests may be logical commands identifying the media and/or logical or physical locations for accessing the media.

A library typically employs one or more controllers, each with one or more processors for receiving the commands (i.e., work requests) and establishing a work queue for the library. The work queue holds one or more commands currently being executed, and may hold additional commands that are waiting to be executed. As the work queue is processed, the controller converts the commands to physical movements of the accessor, and transmits signals for operating servo motors, thereby directing the operation of the accessor(s). Accordingly, this controller is referred to herein as an "accessor controller". An accessor controller may be dedicated to a particular accessor or it may direct or control more than one accessor.

If multiple accessor controllers are employed, and in order for an accessor to serve as a back-up to another accessor in either hot standby or dual active modes, each such accessor controller must possess information regarding the work queue of the other accessor controller(s) in order to assume the outstanding work requests in the event one accessor controller fails, whether the controller itself fails or its accessor fails. One means for providing each accessor controller a copy of the work queue of the other accessor controller, including status information regarding which commands have been received, started and completed by the other accessor controller, is described in commonly-assigned U.S. Pat. No. 6,356,801 "High Availability Work Queuing in an Automated Data Storage Library," which is incorporated herein for its showing of controlling two accessors by synchronizing their work queues. By synchronizing work queues between accessor controllers, each accessor controller is kept apprised of outstanding work requests for the library and can serve as a back-up in the event of the failure of an accessor controller, thereby preventing the loss of work requests.

Regardless of whether a library contains a single accessor controller or multiple accessor controllers, each such controller and its accessor and any associated control lines comprise single points of failure, if the work queues are not synchronized. Any related failure would render a work request for data unfilled or would potentially unacceptably delay access to requested data in the library. More particularly, if a library employs only a single accessor controller, whether to control a single or multiple accessors, the failure of that single accessor controller may result in the loss of the work requests in its queue. Similarly, if a library employs multiple accessor controllers that have independent, non-synchronized work queues, the failure of such controllers also may result in the lost of queued work requests. While synchronizing work queues across multiple accessor controllers offers a solution to loss of work requests from a single point of failure, the effectuation of such synchronization can be complex and can be costly in terms of time required to maintain the synchronized state.

Typically, data stored on data storage media of an automated data storage library, once requested, is needed quickly. Thus, it is desirable that an automated data storage library be maintained in an operational condition as much as possible, such as the well known "24×7×365" availability. In order to achieve and maintain this high availability of data from a library, a need remains to eliminate or reduce the single point of failure that is presently resident at the accessor controller level, as well as to improve the efficiency by which such availability is maintained.

SUMMARY OF THE INVENTION

In accordance with the invention, disclosed is a method for operating an automated data storage library which addresses the above-described problems resident in the art. The library has a plurality of storage shelves for storing data storage media; at least one data storage drive; at least one accessor for accessing and delivering data storage media among the storage shelves and the data storage drive(s) in response to work requests, and at least one accessor controller for controlling the accessor(s). The method comprises providing at least one work request tracking controller for receiving and storing work requests that are also received by accessor controller(s), which then control the movements of an accessor to effectuate the work requests. For purposes of clarity, the direction by an accessor controller to effectuate movement of an accessor may be referred to herein as "commands." When used herein to refer to such direction by an accessor controller, the term "commands" may refer to any control of accessor movement including analog or digital control lines, communication busses, address and data busses, and the like. Upon detection by the work request tracking controller that the accessor may have failed to conduct the command issued by the accessor controller, the work request tracking controller initiates a re-send of the work request to an accessor controller. By providing a work request tracking controller, one provides a failover mechanism in the event an accessor controller fails to successfully direct an accessor in furtherance of a work request and is unable, for whatever reason, to complete the work request. Moreover, in comparison to the synchronization of work request queues across multiple accessor controllers, the failover mechanism offered by this invention may represent a less complex, more readily effectuated failover solution.

A computer program product is also provided herein that has computer readable program code embodied therein for storing and initiating resending, by at least one work request tracking controller, work requests communicated by a host computer to an automated data storage library.

A system for storing and accessing data storage media in response to work requests from a host computer is also provided. The disclosed system comprises an automated data storage library and at least one work request tracking controller. The library has a plurality of storage shelves for storing said data storage media; at least one data storage drive, at least one accessor for accessing and delivering the data storage media among the storage shelves and the data storage drive (s), and at least one accessor controller for directing the accessor(s) in response to the work requests. The work request tracking controller operates to store work requests and to initiate re-sending a work request to an accessor controller(s). The work request tracking controller can be a component within the library itself, but is not so limited, and may in fact reside separate and apart from the library as a component independent of the library but having an association with the library.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

This application is related to the U.S. Pat. No. 6,356,801 which issued on Mar. 12, 2002 to Brian G. Goodman, et al and assigned to the assignee of the present invention entitled, "High Availability Work Queuing in an Automated Data Storage Library" which is hereby incorporated by reference.

Figure 1:
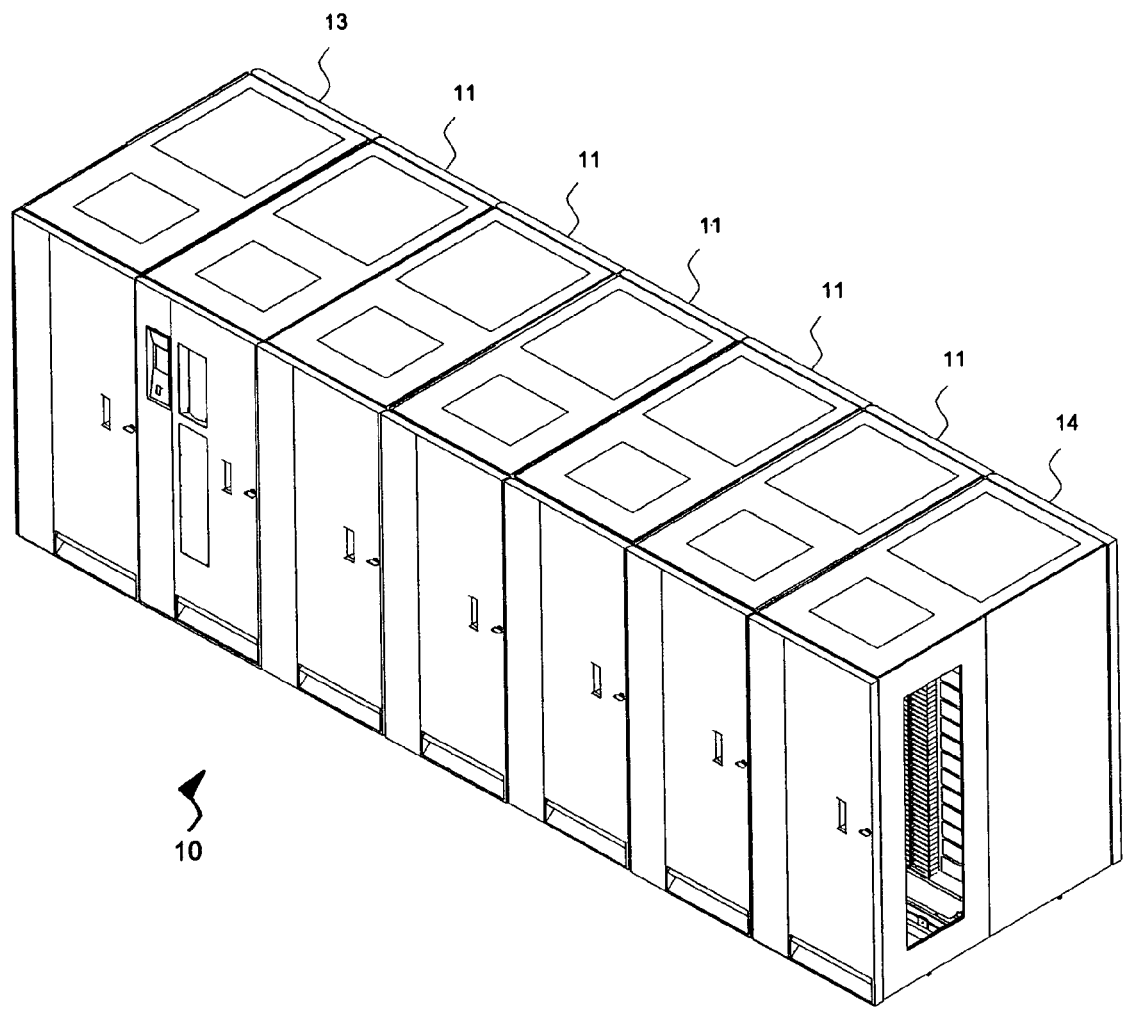
FIG. 1 is an isometric view of an automated data storage library adaptable to implement an embodiment of the present invention, with the view specifically depicting a library having a left hand service bay, multiple storage frames and a right hand service bay.
Figure 2:
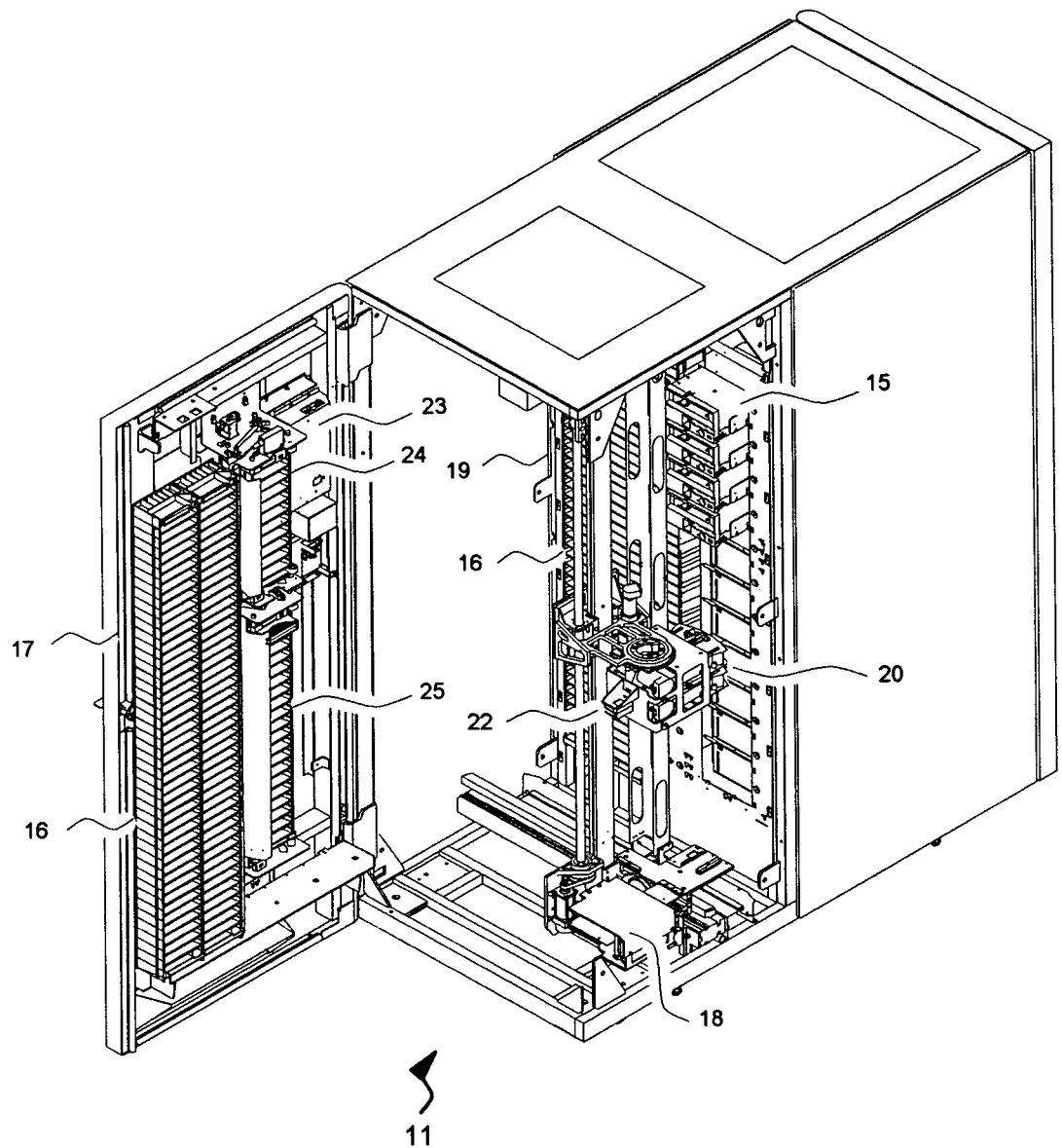
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonomously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16, one front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
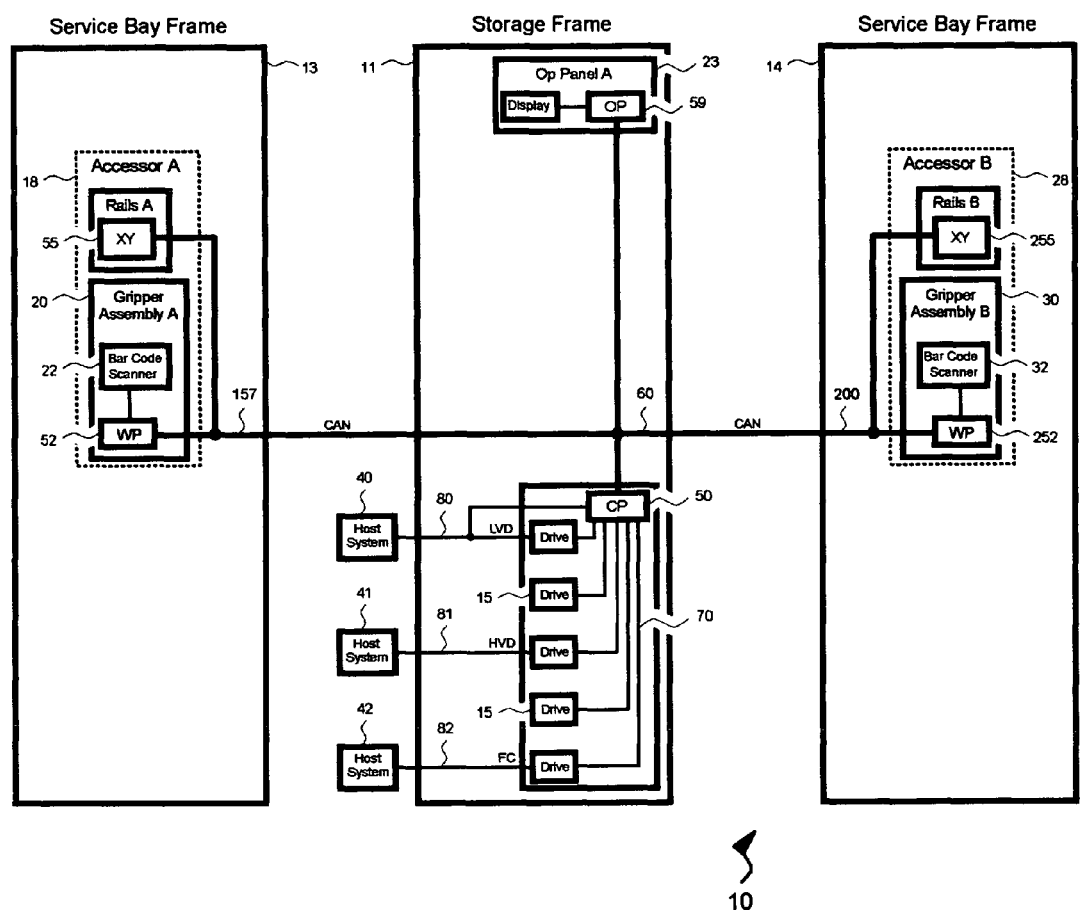
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52,252, and the XY processor nodes 55,255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
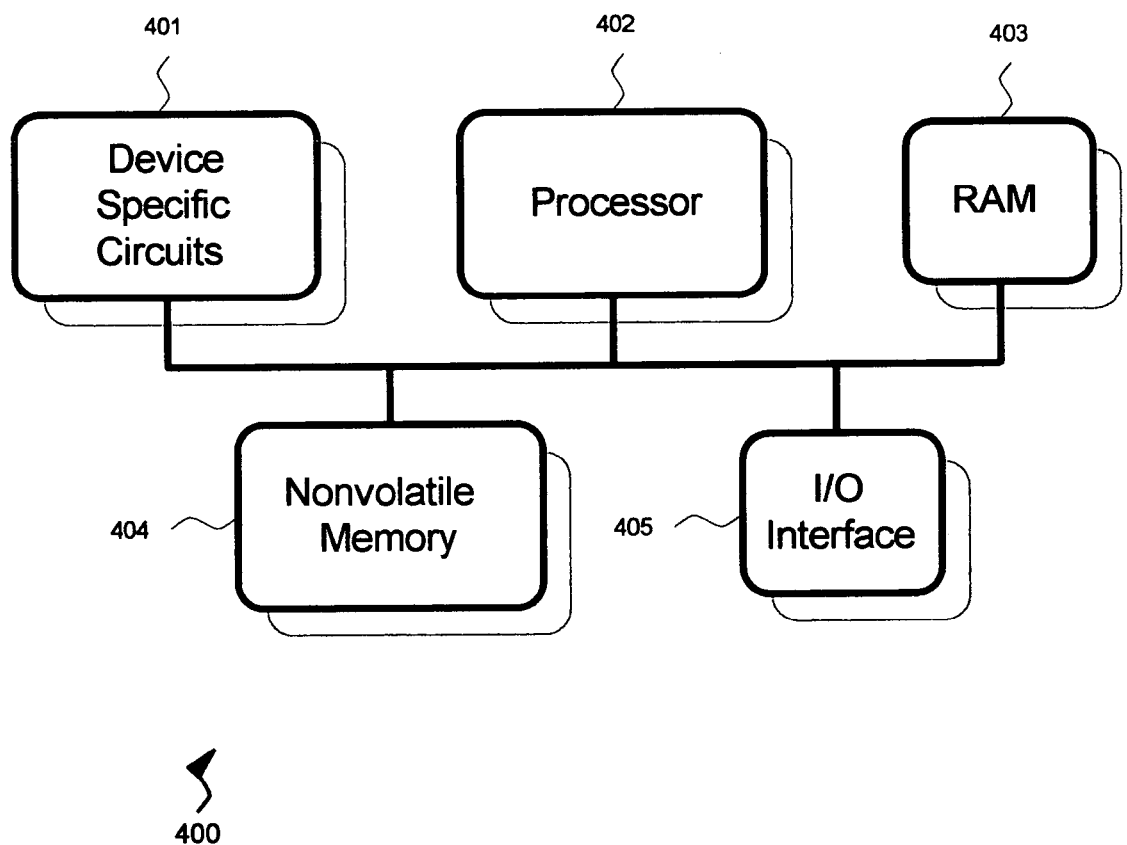
FIG. 4 is a block diagram depicting an exemplary controller configuration.

An automated data storage library 10 typically comprises one or more controllers to direct the operation of the automated data storage library. Host computers and interconnect components typically comprise similar controllers, as do the work request tracking controllers employed in the present invention. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus) or SCSI (Small Computer Systems Interface). The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

Accessors, such as exemplary accessors 18, 28, are directed by controllers termed herein as "accessor controllers." Accessor controllers receive work requests in the form of logical commands from hosts, and the accessor controllers decode such work requests, determine the required actions to fulfill such work requests, and convert the actions to physical movements of the accessors, thereby directing the accessors to fulfill the work requests.

Figure 6:
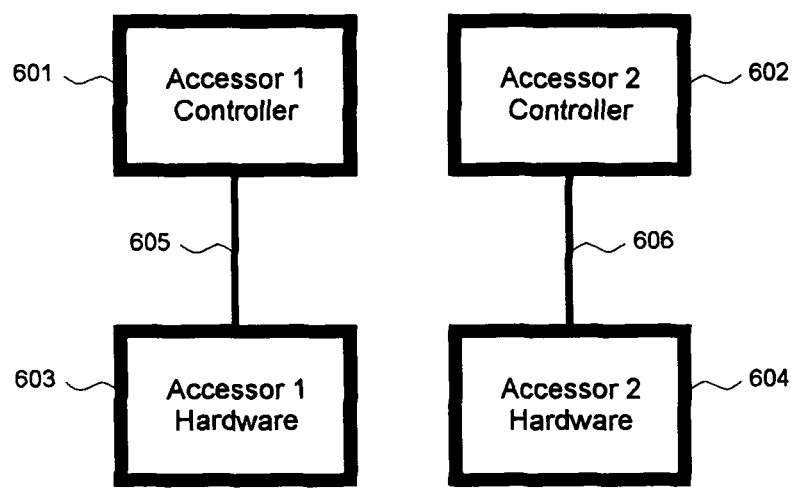
FIG. 6 is a block diagram depicting an embodiment of the association of accessor controllers to accessors in an automated data storage library, as may be implemented in an embodiment of the present invention.

In a distributed control system such as illustrated in FIG. 3, the work processor nodes 52, 252 serve as accessor controllers for accessors 18, 28. Since the present invention may be implemented in automated data storage libraries regardless of control configuration, the items "access controllers" and "accessor" are identified in FIGS. 6-9 more generally as accessor controllers 601, 602 (rather than 52, 252) and accessors 603, 604 (rather than 18, 28), so as not to imply any limitation to implementation in libraries having a particular type of control configuration, such as the distributed control system depicted in FIG. 3. FIG. 6 illustrates how an accessor controller may be associated with an accessor. Accessor controller 601 is associated with accessor 603 through connection 605 and accessor controller 602 is associated with accessor 604 through connection 606. Connections 605, 606 may comprise analog or digital electrical connections to control the accessor hardware, such as motors or servo mechanisms. Alternatively, connections 605, 606 may comprise communications lines such as RS-232, Firewire, USB (Universal Serial Bus), SCSI (Small Computers Systems Interface), CAN (Controller Area Network) or any other communications interface known to those of skill in the art. Still further, connections 605, 606 may comprise wireless interfaces such as Infrared, RF (Radio Frequency) or any other wireless interfaces known to those of skill in the art. In the configuration depicted in FIG. 6, each accessor controller is associated with its own accessor so each accessor controller may only operate its own accessor. If one accessor or its associated accessor controller fails then the other accessor with its associated accessor controller may take over. For example, a failure of accessor controller 601, its interface 605 or its associated accessor 603 would result in accessor controller 602 and its associated accessor 604 taking over. In this case the library could no longer operate in a dual-active mode but it may continue to operate because of the hot-standby capabilities that can be achieved with the dual-active design.

Figure 7:
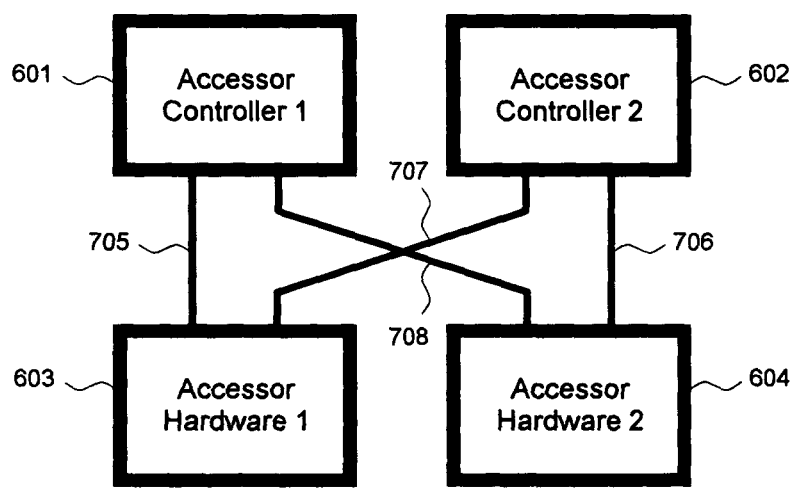
FIG. 7 is a block diagram depicting an embodiment of the association of accessor controllers to accessors in an automated data storage library, as may be implemented in an embodiment of the present invention.

FIG. 7 illustrates an alternative association where accessor controller 601 is associated with accessor 603 through connection 705 and accessor controller 601 is also associated with accessor 604 through connection 708. Accessor controller 602 is associated with accessor 604 through connection 706 and accessor controller 602 is also associated with accessor 603 through connection 707. Connections 705-708 may comprise analog or digital electrical connections to control the accessor hardware, such as motors or servo mechanisms. Alternatively, connections 705-708 may comprise communications lines such as RS-232, Firewire, USB (Universal Serial Bus), SCSI (Small Computers Systems Interface), CAN (Controller Area Network) or any other communications interface known to those of skill in the art. Still further, connections 705-708 may comprise wireless interfaces such as Infrared, RF (Radio Frequency) or any other wireless connections known to those of skill in the art. Each accessor controller is associated with both accessors so each accessor controller may operate both accessors. If one accessor controller fails then the other accessor controller may take over. For example, a failure of accessor controller 601 would result in accessor controller 602 taking over. In this case the library may continue to operate in either a dual-active mode or hot-standby mode. If one accessor fails then the other accessor may take over. For example, a failure of accessor 603 would result in accessor 604 taking over. In this case the library can no longer operate in a dual-active mode but hot-standby mode would prevent the library from failing altogether.

Referring to FIGS. 6 and 7, a work request may be directed to a particular accessor. For example, the SCSI Move Medium command allows a Medium Transport Element to be specified in the move command and a library may support this capability. A Medium Transport Element may comprise the gripper of an accessor. Therefore, specifying a Medium Transport Element in the SCSI Move Medium command may result in a command being directed to a particular accessor. There may be other ways to direct a command to an accessor such as with command routing or other command fields that may cause one accessor to be selected over another.

A work request may also be directed to a particular accessor controller. For example, if each accessor has its own associated accessor controller then specifying a Medium Transport Element in the SCSI Move Medium command may result in a command being directed to a particular accessor controller. There may be other ways to direct a command to an accessor controller such as with command routing or other command fields that may cause one accessor controller to be selected over another.

The associations of FIGS. 6, 7 and the accompanying descriptions are for illustrative purposes and are not meant to limit the scope of the invention. Other variations of association between accessors and accessor controllers may be made without deviating from the spirit and scope of the invention. For example, the accessor controllers 601, 602 may comprise more than one controller. In addition, the accessors 603, 604 may comprise one or more controllers for operating the hardware of the accessors.

In accordance with the present invention, and in order to provide additional failover capability to a library in the event an accessor controller 601, 602 fails to fulfill a work request, an additional controller function is implemented to offer another layer of work queue redundancy to the library function. In particular, the additional controller function is referred to herein as a "work request tracking controller" and is identified in FIGS. 8-9 as work request tracking controller 810. In the practice of the invention, at least one work request tracking controller 810 is provided for receiving and storing work requests that are also intended for receipt by accessor controller(s) 601, 602. Upon detection by the work request tracking controller 810 that an accessor controller 601, 602 has failed to fulfill a work request (regardless of the point of failure, i.e., the accessor 603, 604 or the accessor controller 601, 602 itself), the work request tracking controller 810 initiates a re-send of the work request to an accessor controller 601, 602. Thus, by providing the function of a work request tracking controller 810, one provides a failover mechanism in the event an accessor controller 601, 602 fails to successfully direct an accessor 603, 604 in furtherance of a work request and has, for whatever reason, lost the work requests in its queue to complete the work request.

In a distributed control system such as illustrated in FIG. 3, the communication processor node 50 may serve as the work request tracking controller 810. Since the present invention may be implemented in automated data storage libraries regardless of control configuration, the work request tracking controller is identified in FIGS. 6-9 more generally such as item 810, so as not to imply that it must be implemented in the communication processor node 50, or that the invention is in any way limited to implementation in libraries having a particular type of control configuration, such as the distributed control system depicted in FIG. 3.

Figure 5:
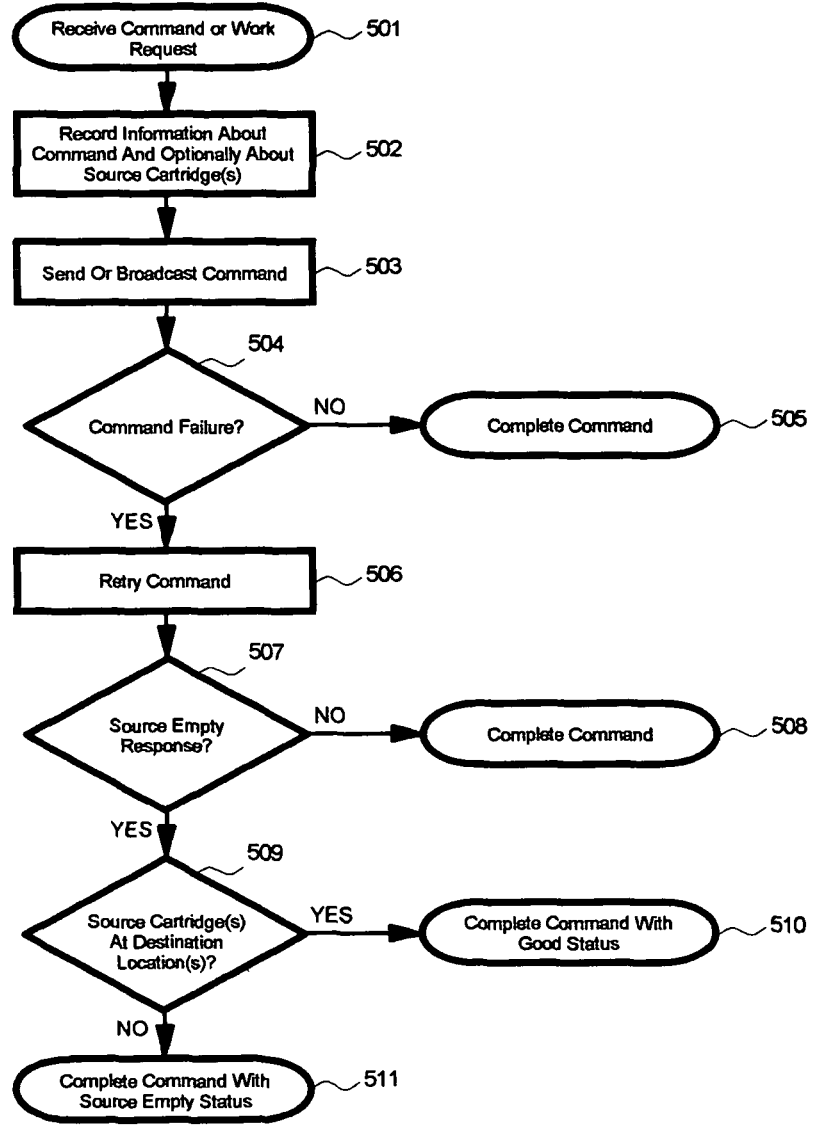
FIG. 5 is a flow chart depicting an embodiment of the method of receiving work requests by an automated data storage library, storing information regarding the work request; and re-sending the work request using the stored work request information, as may be implemented in an embodiment of the present invention.
Figure 8:
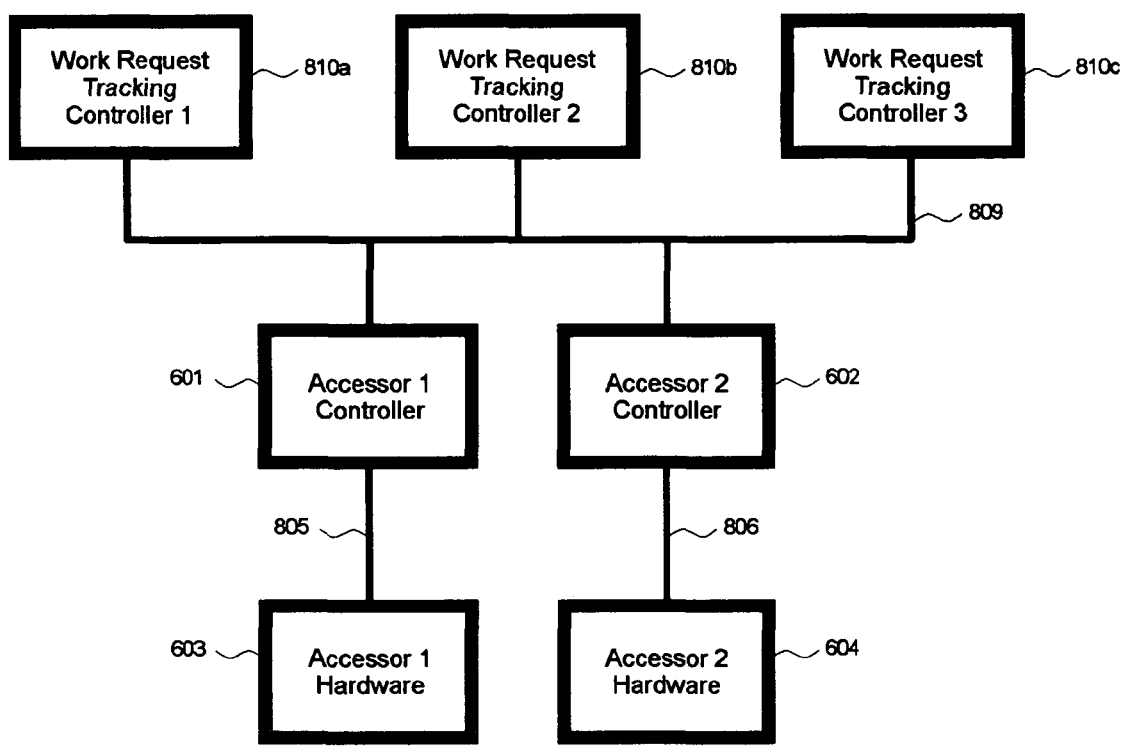
FIG. 8 is a block diagram depicting an embodiment of the system of providing a work request tracking controller for storing work requests and for initiating re-sending work requests to accessor controller(s), as may be implemented in an embodiment of the present invention.

The invention can be better understood by referring to FIGS. 4, 8 and the flowchart of FIG. 5. A work request tracking controller 810 of the library 10 receives a work request at step 501. For example, in a library employing a distributed control system such as depicted in FIG. 3, communication processor node 50 may receive a work request from host system 40 through line 80. Information about the work request is recorded and stored at step 502, with the information being stored in any memory that is accessible by the work request tracking controller 810, such as but not limited to the RAM 403 that may be associated with the controller 810. The information so recorded and stored may comprise a copy of the work request, but in any event, comprises enough information to reconstruct the work request should a re-send of the work request be necessary. The work request may comprise instructions to move more than one cartridge, for example, a SCSI Exchange Medium command which moves more than one cartridge. Additional information may be saved at this step such as an identifier associated with the cartridge(s) at the source location(s) of the cartridge movement command. For example, the value of the cartridge label(s) may be saved.

At step 503, the work request is sent or broadcast to one or more accessor controllers 601, 602. For example, in a library employing a distributed control system such as depicted in FIG. 3, communication processor node 50 may send the work request to work processor node 52 of the first accessor 18 and/or work processor node 252 of the second accessor 28. The decision to direct the work request command to one accessor or one accessor controller as opposed to sending the command to more than one accessor or accessor controller, or broadcasting the command without a specific accessor or accessor controller specified is a design preference. For example, one design may dictate that the work request be sent or broadcast to more than one accessor and logic at a lower level would determine which accessor actually performs the work. Another design may dictate that this decision is made at a higher level, such as with communication processor node 50 at step 503.

At step 504, a determination is made by the work request tracking controller 810 regarding whether a command failure has occurred, i.e., whether there has been a failure by the library 10 to fulfill the work request. If a command failure has not been detected as indicated at step 504, then control moves to step 505 where the command is considered completed, i.e., where the work request received from the host system 40 in step 501 is considered fulfilled or where the library has no further automated recourse toward fulfilling the command. Command completion may optionally involve returning status to the sender from step 501. For example, communication processor node 50 may return status to host system 40 through line 80.

Certain failures may also proceed to step 505. For example, a command to move a cartridge from a source location to a destination location may fail if the source location is empty. This type of failure is not usually caused by an accessor failure and it may be desired to report an error, rather than performing a command retry. In this case, command completion in step 505 may simply involve returning status to the sender from step 501.

If a command failure has been detected as indicated at step 504, then control moves to step 506 where a retry command is sent or broadcast to one or more accessor controllers 601, 602. In the event control has moved to step 506, the retry command is initiated by the work request tracking controller 810, which retrieves the information stored in step 502 regarding the work request and, if necessary, reconstructs the work request from the thus-stored information. The work request tracking controller 810 then sends or broadcasts the work request, as reconstructed, to one or more accessor controllers 601, 602. Alternatively, the work request tracking controller 810 sends or broadcasts the work request to another controller or node for distribution to one or more accessor controllers 601, 602. For example, in fulfilment of step 506 in a library 10 employing a distributed control system, the work request tracking controller 810 may send or broadcast the work request, as reconstructed, to a communication processor node 50 for distribution to work processor node 52 of the first accessor 28 and/or work processor node 252 of the second accessor 28 (FIG. 4). As described above, the command may be sent to a particular work processor node 52, 252, or it may be sent to more than one work processor node 52 or 252 in parallel. For example, communication processor node 50 may send the command to work processor node 252 because it had previously sent the same command to work processor node 52 before the command failure. Alternatively, communication processor node 50 may broadcast the command to all work processor nodes 52, 252 and the then "active" accessor may execute the command. Still further, some process other than communication processor node 50 and work processor nodes 52, 252 may determine which accessor executes the command.

After step 506 in FIG. 5, various other steps (such as steps 507 and 509) may be appended toward diagnosing the status of the fulfilment of a work request, although the practice of the invention is not limited to appending any such steps. As depicted in FIG. 5, a check is made at step 507 to determine whether the source location of a move or exchange command is empty. If the command response indicates that the source location was not empty as indicated at step 507, then control moves to step 508 where the command is completed. The completion of the command may involve, as an example, returning good or bad status to the work request tracking controller 810 and/or having the work request tracking controller 810 returning good or bad status to the sender from step 501, depending on the outcome of the move or exchange command. Another example would be having the communication processor node 50 return status to host system 40 through line 80. If on the other hand, the command response indicates that the source location was empty as indicated at step 507, then control moves to step 509. Step 509 uses information that was recorded at step 502 to determine if each source cartridge is at the associated destination location as specified in a move or exchange command. This may occur if the first accessor controller successfully moved the cartridge from the source location to the destination location prior to the failure. If each source cartridge is at the associated destination location as indicated at step 509, then control moves to step 510 where the command is completed with good status. The completion of the command with good status may involve, as an example, returning good status to the work request tracking controller 810 and/or having the work request tracking controller 810 returning good status to the sender from step 501, because the cartridge(s) is at the associated destination location as requested by a move or exchange command. Another example would be having the communication processor node 50 return good status to host system 40 through line 80. If on the other hand, the source cartridge is not at the destination location as indicated at step 509, then control moves to step 511 where the command is completed with source empty status. Status may be returned to the sender from step 501 at this step. For example, communication processor node 50 may return status to host system 40 through line 80. The status may indicate an error because the cartridge is not in the source location and it is not in the destination location. Various circumstances could result in the foregoing status, including but not limited to the source location being empty prior to step 501 or the cartridge remaining in a gripper of the first accessor. Any controller(s) executing the steps of FIG. 5 may make attempts to ascertain more detail about the failure in order to report more accurate status to the sender from step 501.

It is noted that, upon returning a good complete status to the sender from step 501 of the successful fulfilment of a work request, the work request tracking controller 810 is contemplated to delete the associated completed work request from its inventory of work requests, thereby maintaining only an active list of outstanding work requests in storage.

Steps of the flowchart may be changed, added or removed without deviating from the spirit and scope of the invention. For example, in the absence of steps 507 and 508, a successful retry would move to step 509 where the source cartridge would be found to be at the source location. Moreover, in certain embodiments, individual steps recited in FIG. 5 may be combined, eliminated, or reordered. For example, steps 501 and 503 can be performed in parallel, i.e., the work request tracking controller's receipt and storing of the command in steps 501 and 502 can be independent and conducted in parallel to the sending or broadcasting of commands by accessor controllers 601, 602 in step 503.

FIGS. 8 and 9 further illustrate the configuration of the work request tracking controller 810 in relation to the library 10 and its components. Turning first to FIG. 8, this figure further depicts the layered work queue redundancy achieved using the work request tracking controller 810. As depicted, one or more work request tracking controllers 810a, 810b, 810c are associated with and coupled to accessor controllers 601, 602 through connection 809. Connection 809 is shown as a single multi-drop connection but may alternatively comprise one or more independent connections between controllers 810a, 810b, 810c and the accessor controllers 601, 602. For example, connection 809 may comprise one or more communication interfaces such as RS-232, Firewire, USB (Universal Serial Bus), Ethernet, SCSI (Small Computers Systems Interface), CAN (Controller Area Network) or any other communications interface known to those of skill in the art. Still further, connection 809 may comprise one or more wireless connections such as Infrared, RF (Radio Frequency) or any other wireless connections known to those of skill in the art. It is noted that the connection 809 is not necessarily a direct connection, in that there may be intervening components between the work request tracking controllers 810 and the accessor controllers 601, 602.

As has been described above, the work request tracking controller 810 is contemplated to comprise a controller that is independent from, yet connected or coupled in parallel or serially to, an accessor controller 601, 602. The work request tracking controller(s) 810 stores work requests (refer to step 502 in FIG. 5) that are intended for receipt and fulfilment by accessor controllers 601, 602, which are contemplated to have work queues comprising such work requests. Work requests from the host system 40 are stored by the work request tracking controller 810 (in accordance with step 502 of FIG. 5) in the event the accessor controller 601, 602 fails to fulfill the work request and it becomes desirable to send a retry command to an accessor controller 601, 602 for such outstanding work request (in accordance with step 506). Herein, an outstanding library work request is one that has been received by the library 10 but that has not been reported to the sender (i.e., the host system 40) as being completed.

Examples of circumstances that might result in a command failure leading to the necessity to send a command retry pursuant to step 506 include, but are by no means limited to, a failure of the first accessor 603, resulting in the work request tracking controller 810 sending one or more outstanding commands to the second accessor controller 602 of the second accessor 604. Other examples include a command response time-out, an indication of a command error, and an indication that an accessor switch over has occurred, among other circumstances. An accessor "switch over" refers to circumstances in which control for, or fulfilment of, a particular work request transfers from one accessor or accessor controller to another accessor or accessor controller, respectively. An example of circumstances leading to a switch over include a reset of an accessor 603, 604, which reset may comprise a hardware reset, a software reset, a power off/on, a software branch, a software jump, or a software call, among others. Alternatively, a switch over may comprise one accessor taking over for another accessor. This may include taking over a single command, a group of commands, future commands, becoming the recipient of commands, the accessor in control, the master accessor, etc. A switch over may occur because of an accessor failure. Alternatively, a switch over may be caused by some other event. For example the switch over may be caused or initiated by, for example, an operator, a service action, a command, another controller, an interconnect component, or a host computer, among others. If the command failure derives from circumstances involving a switch over, then the switch over may be communicated to the relevant work request tracking controller 810, such that step 504 is answered affirmatively and the work request tracking controllers initiates the retry in step 506. For example, work processor node 252 may notify communication processor node 50 that it is taking over for work processor node 52 (FIG. 4). In another example, work processor node 52 may notify communication processor node 50 that it has gone through a reset. Examples of causes for a reset include, but are not limited to, an ERP (Error Recovery Procedure), a watchdog timer expiration, a SCSI bus reset, and a reset command or request.

Figure 9A:
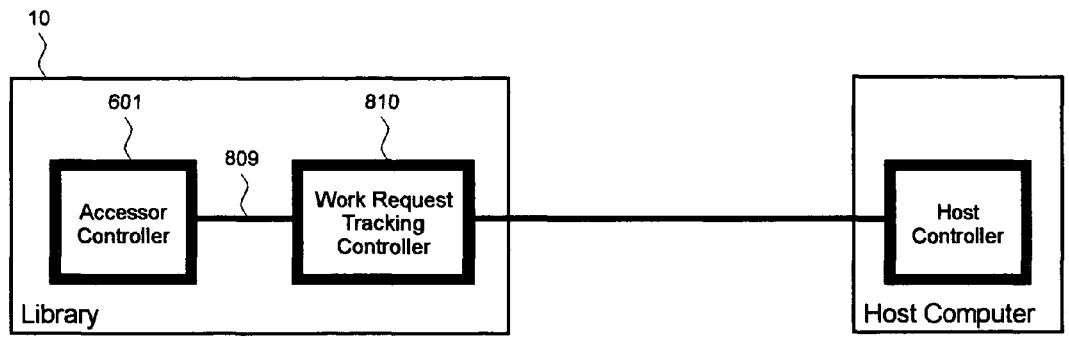
FIGS. 9A-9D are block diagrams depicting alternate embodiments of the system in which a work request tracking controller is provided for storing information regarding work requests issued from a host computer and for using the stored work request information to initiate re-sending stored work requests to accessor comtroller(s), as may be implemented in an embodiment of the present invention.
Figure 9B:
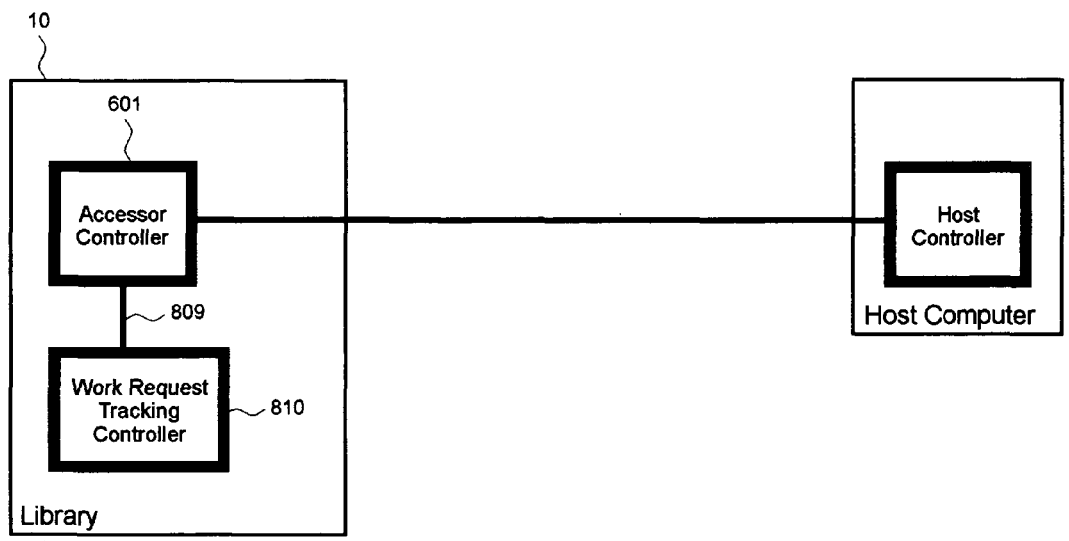
Figure 9C:
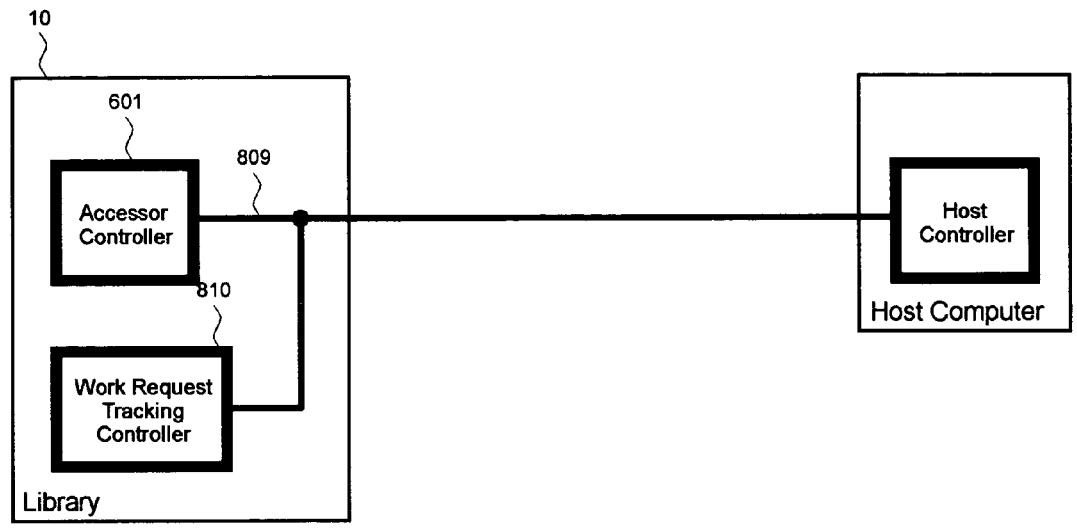

Turning to FIGS. 9A-9D, the work request tracking controller 810 may reside in any physical location in relation to the library 10 so long as it is capable of receiving work requests from the host system 40 and can re-send work requests to the accessor controller(s) 601, 602. Examples of configurations of the work request tracking controller 810 include being configured inside the library 10 as depicted in FIGS. 9A, 9B and 9C. The work request tracking controller and the accessor controller are connected, as described above, via line 809, and are contemplated to receive work requests either in parallel (as shown in FIG. 9C) or serially (as shown in FIGS. 9A and 9B). If serially, the work request tracking controller 810 can receive the work request first then pass it on to the accessor controller 601, as depicted in FIG. 9A, or the accessor controller 601 can receive the work request first then pass to the work request tracking controller 810, as depicted in FIG. 9B. It should be noted that the work request tracking controller 810 is not necessarily a dedicated controller in that it may be combined with another controller that is part of, or associated with, the library 10. For example, communication processor node 50 of FIG. 3 may serve both as a communication processor node and as a work request tracking controller.

Figure 9D:
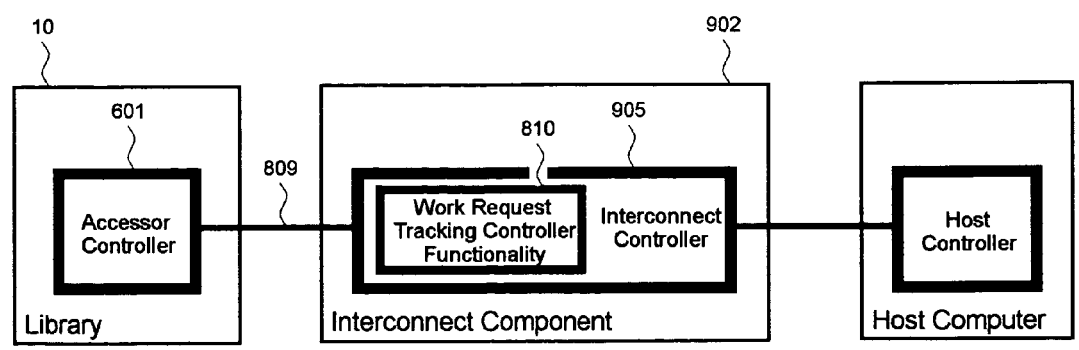

An example of another type of configuration is depicted in FIG. 9D. In this figure, the work request tracking controller is shown as associated with, or as, an interconnect component 902 that is independent from, but yet connected to, the library 10. An interconnect component 902 is used to expand the capabilities of the library or to expand the capabilities of the network that connects the library 10 to one or more host computers. For example, an interconnect component 902 may provide additional library functionality such as partitioning or virtualization. In another example, an interconnect component 902 may provide additional network functionality such as, but not limited to, Fibre Channel switch ports, Fibre Channel to SCSI conversion, and SAN data gateway connectivity. It should be noted that the work request tracking controller 810 is not necessarily a dedicated controller in that it may be combined with another controller that is part of the interconnect component 902 as shown in FIG. 9D. For example, the functionality of the work request tracking controller 810 may be provided by the interconnect controller 905.

One skilled in the art, and having the benefit of the foregoing description, will recognize that the interconnect component 902 may comprise more than one controller, for example but not limited to, an interconnect controller 905 and a work request tracking controller 810. In this case, the work request tracking controller 810 would be an independent controller, having separate and distinct functionality from the functionality of the interconnect controller 905, and would be coupled or connected to the accessor controller 601 and/or the interconnect controller 905 in a number of different serial or parallel arrangements similar to the arrangements shown in FIGS. 9A-9C.

The drawings and description of the embodiments described above centered around a multiple accessor design but one skilled in the art should recognize that this invention can be equally applied to a single accessor design. For example, there may be a failure of an accessor controller such that a reset or power cycle of the controller may correct the problem. The layered work queue redundancy of this invention would be able to handle such a reset in a transparent manner.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A method for operating an automated data storage library, said library comprising a plurality of storage shelves for storing data storage media, at least one data storage drive, at least one accessor for accessing and delivering data storage media among said storage shelves and said at least one data storage drive in response to a work request, and at least one accessor controller for controlling said at least one accessor, comprising:
   providing at least one work request tracking controller;
   receiving said work request by said at least one work request tracking controller;
   storing information regarding said work request in memory accessible by said at least one work request tracking controller;
   receiving said work request by at least one of said accessor controllers; and
   wherein if said at least one work request tracking controller determines that said work request is not satisfied by said library, sending a second work request by said at least one work request tracking controller based upon said stored information to at least one of said accessor controllers.

2. The method of claim 1, wherein said step of providing at least one work request tracking controller comprises coupling said at least one work request tracking controller to each of said at least one accessor controllers.

3. The method of claim 1, wherein said library further comprises said at least one work request tracking controller, and wherein the step of providing at least one work request tracking controller comprises coupling said at least one work request tracking controller to each of said at least one accessor controllers.

4. The method of claim 1, wherein said at least one work request tracking controller comprises a memory contained in said at least one work request tracking controller, said method further comprising the additional step of maintaining an inventory of said work requests.

5. The method of claim 4, further comprising the additional steps of issuing at least one command by said at least one of said accessor controllers to at least one accessor in response to said work request and providing notice to said at least one work request tracking controller of successful execution by said at least one accessor of said at least one command.

6. The method of claim 5, further comprising the additional step of deleting from said inventory said work request corresponding to said at least one command for which said notice of successful execution is provided.

7. The method of claim 1, wherein said work request tracking controller comprises at least one communication processor node and said accessor controller comprises at least one work processor node, and wherein said method further comprises the steps of:
   said at least one communication processor node receiving said work requests and broadcasting said work requests to said at least one work processor nodes.

8. The method of claim 4, wherein said sending step of said second work request further comprises determining which at least one work request in said inventory corresponds to said at least one command said accessor failed to conduct.

9. The method of claim 8, wherein said method further comprises said at least one work request tracking controller sending said determined at least one work request to at least one of said accessor controllers.

10. The method of claim 9, wherein said at least one work request tracking controller sends said determined at least one work request to said at least one of said accessor controllers.

11. A system for storing and accessing data storage media in response to work requests from a host computer, comprising:
   an automated data storage library comprising a plurality of storage shelves for storing said data storage media, at least one data storage drive, at least one accessor for accessing and delivering said data storage media among said storage shelves and said at least one data storage drive, and at least one accessor controller for directing said at least one accessor by issuing at least one command to said at least one accessor in response to said work requests; and
   at least one work request tracking controller for storing information regarding said work requests and for sending a second work request to said at least one accessor controller, said second work request based upon said stored information.

12. The system of claim 11, wherein said at least one work request tracking controller is coupled to said at least one accessor controller.

13. The system of claim 11, wherein said library further comprises said at least one work request controller, and wherein said work request controller is coupled to said at least one accessor controller.

14. The system of claim 11, wherein said at least one work request tracking controller includes a memory portion for storage of an inventory of said work requests, said memory portion coupled to said work request tracking controller.

15. The system of claim 14, wherein said automated data storage library is adapted to provide notice to said at least one work request tracking controller of successful execution by said at least one accessor of said at least one command.

16. The system of claim 15, wherein said work request tracking controller is adapted to determine which at least one work request stored in said inventory corresponds to said at least one command.

17. The system of claim 16, wherein said inventory consists essentially of work requests corresponding to said at least one command for which said at least one work request tracking controller has not received said notice of successful execution by said at least one accessor controller.

18. The system of claim 12, wherein said work request tracking controller comprises at least one communication processor node and wherein said at least one accessor controller comprises at least one work processor node.

19. The system of claim 16, wherein said at least one work request tracking controller is adapted to send said determined at least one work request to at least one of said accessor controllers.

20. The system of claim 19, wherein said at least one accessor comprises two accessors and wherein said at least one accessor controller comprises two accessor controllers.

21. A computer program product on a computer-readable medium usable with a programmable computer, said computer program product having computer readable program code embodied therein for storing and initiating resending, by at least one work request tracking controller, work requests communicated by a host computer to an automated data storage library, said automated data storage library having a plurality of storage shelves for storing data storage media, at least one data storage drive, at least one accessor for accessing and delivering data storage media among said storage shelves and said at least one data storage drive in response to said work requests, and at least one accessor controller for controlling said at least one accessor, said computer program product comprising instructions for:

receiving said work request by said at least one work request tracking controller;

storing information regarding said work request in memory accessible by said at least one work request tracking controller;

receiving said work request by at least one of said accessor controllers;

issuing at least one command by said at least one of said accessor controllers to at least one accessor in response to said work request;

detecting a failure by said at least one accessor to conduct said at least one command; and wherein if said at least one work request tracking controller determines that said at least one accessor failed to conduct said at least one command, sending a second work request by said at least one work request tracking controller based upon said stored information to at least one of said accessor controllers.

22. The computer program product of claim 21, wherein said memory accessible by said at least one work request tracking controller comprises a memory contained in said at least one work request tracking controller, said computer program product further comprising instructions for maintaining an inventory of said work requests in said accessible memory.

23. The computer program product of claim 21, further comprising the additional instructions for providing notice to said at least one work request tracking controller of successful execution by said at least one accessor of said at least one command.

24. The computer program product of claim 22, further comprising the additional instructions for deleting from said inventory said information regarding said work request corresponding to said at least one command for which said notice of successful execution is provided.

25. The computer program product of claim 22, wherein said sending step of said second work request comprises determining which information in said inventory regards said at least one work request corresponding to said at least one command said accessor failed to conduct and reconstructing said second work request using said determined information.

26. The computer program product of claim 25, wherein said sending step of said second work request comprises sending a second work request by said at least one work request tracking controller based upon said stored information to said at least one of said accessor controllers.

27. The computer program product of claim 25, wherein said automated data storage library includes two accessors, and wherein said computer program product further comprises instructions for selecting one of said two accessors to receive said second work request and for sending said second work request to at least one accessor controller to direct said selected accessor to conduct commands necessary to fulfill said second work request.

* * * * *